US007174061B2

(12) United States Patent
Rougeault et al.

(10) Patent No.: US 7,174,061 B2
(45) Date of Patent: Feb. 6, 2007

(54) EXTENSOMETER COMPRISING A FLEXIBLE SENSING ELEMENT AND BRAGG GRATINGS

(75) Inventors: Stéphane Rougeault, Sceaux (FR); Pierre Ferdinand, Houilles (FR)

(73) Assignee: Commissariat a L'Energie Atomique, Paris (FR)

( * ) Notice: Subject to any disclaimer, the term of this patent is extended or adjusted under 35 U.S.C. 154(b) by 0 days.

(21) Appl. No.: 10/543,442

(22) PCT Filed: Jan. 30, 2004

(86) PCT No.: PCT/FR2004/050036

§ 371 (c)(1),
(2), (4) Date: Jul. 25, 2005

(87) PCT Pub. No.: WO2004/070314

PCT Pub. Date: Aug. 19, 2004

(65) Prior Publication Data

US 2006/0159385 A1    Jul. 20, 2006

(30) Foreign Application Priority Data

Jan. 31, 2003    (FR) .................................. 03 01126

(51) Int. Cl.
*G02B 6/26* (2006.01)
*G02B 6/34* (2006.01)

(52) U.S. Cl. .............................. 385/13; 385/10; 385/37

(58) Field of Classification Search .................. 385/10, 385/12, 13, 37
See application file for complete search history.

(56) References Cited

U.S. PATENT DOCUMENTS

| 2003/0012499 A1* | 1/2003 | Mendez et al. ................ 385/37 |
| 2004/0114850 A1* | 6/2004 | Dewyntermarty et al. ..... 385/13 |
| 2005/0169568 A1* | 8/2005 | Shang et al. ................... 385/13 |

FOREIGN PATENT DOCUMENTS

| DE | 199 22 102 | 12/2000 |
| WO | 00/60312 | 10/2000 |

OTHER PUBLICATIONS

Ferdinand, Pierre et al., "Mine Operating Accurate *Stability* Control with Optical Fiber Sensing and Bragg Grating Technology: The European Brite/Euram *Stabilos* Project," Journal of Lightwave Technology, vol. 13, No. 7, pp. 1303-1313, Jul. 1995.

* cited by examiner

*Primary Examiner*—John D. Lee
(74) *Attorney, Agent, or Firm*—Thelen Reid Brown; Raysman & Steiner LLP

(57) ABSTRACT

Extensometer with flexible test specimen and Bragg gratings applied in particular to the monitoring of concrete structures, is configured to measure deformations of a host material and comprises at least one test specimen which undergoes linear bending stresses, and at least one Bragg grating formed in an optic fibre and fixed to the test specimen. The extensometer configured such that any deformation of the host material is transmitted to the grating via the test specimen. The extensometer also comprises mechanical means which transform deformation of the material into bending of the test specimen, which deforms the grating.

17 Claims, 4 Drawing Sheets

EXTENSOMETER COMPRISING A FLEXIBLE SENSING ELEMENT AND BRAGG GRATINGS

CROSS-REFERENCE TO RELATED APPLICATION

This application claims priority based on International Patent Application No. PCT/FR2004/050036, entitled "Extensometer Comprising a Flexible Sensing Element and Bragg Gratings" by Stephane Rougeault and Pierre Ferdinand, which claims priority of French Application No. 0301126, filed on Jan. 31, 2003, and which was not published in English.

TECHNICAL AREA

The present invention concerns an extensometer using at least one Bragg grating formed in the core of an optic fibre, and at least one test specimen with which the Bragg grating is made integral.

The extensometer subject of the invention finds particular application in the areas of civil engineering, public works and geotechnics.

It is more particularly intended to measure major deformation and displacement, in the order of a few millimetres, which may occur in land or in concrete structures for example.

With the invention, it is possible in particular to detect and follow-up cracks which may appear in such structures.

PRIOR ART

It is recalled firstly, that a deformation measurement system, using one or more measurement Bragg gratings, may comprise a broad spectrum optical source, ranging from 1225 nm to 1325 nm for example, or from 1530 nm to 1570 nm, and a spectral analysis system for the location of Bragg rays and for their referencing with respect to one or more reference Bragg gratings.

This spectral analysis system and the optical source are optically coupled, for example by means of a 50/50 optical coupler, to the optic fibre comprising each measurement Bragg grating and to the optic fibre comprising each reference Bragg grating.

Also, several extensometers using Bragg gratings are already known.

Particular reference may be made to the following documents:

[1] International application PCT/FR00/00806 of 30 Mar. 2000, M. Bugaud et al.

[2] FR 2 823 299, V. Dewynter-Marty et al.

The extensometer described in document [1] uses a test specimen in composite material which is co-extruded with an optic fibre containing a Bragg grating.

This extensometer is suitable for monitoring structures in concrete, a material whose elasticity ranges from $-2500\ \mu\epsilon$ to $+250\ \mu\epsilon$. It is recalled in this respect that $1\ \mu\epsilon$ corresponds to $1\ \mu m/m$ i.e. to $10^{-6}$.

However, this extensometer is difficult to use when the basis of measurement exceeds one metre on account of buckling problems associated with compression measurements.

The extensometer described in document [2] overcomes this drawback. In this extensometer, the optic fibre containing the Bragg grating is placed in a tube which serves as test specimen and is stretched between the two ends of this tube.

This extensometer is also suitable for monitoring concrete structures, but its operating sphere is limited by the range of elasticity of the optic fibre and only ranges from $-5000\ \mu\epsilon$ to $+5000\ \mu\epsilon$.

On this account, this extensometer cannot be used for measuring major deformations, of the kind seen in a fissuring concrete structure.

To overcome this disadvantage and to be able to measure deformations or displacements in the order of a few millimetres, an extensometer with Bragg grating has been developed comprising a fixed part, a mobile part able to slide within the fixed part, and a system of springs making it possible to step down the displacement to be measured and hence the elongation undergone by the optic fibre in which the Bragg grating is formed.

In this respect, reference may be made to the following document:

[3] P. Ferdinand et al., Mine Operating Accurate Stability Control with Optical Fiber sensing and Bragg Grating Technology: the BRITE STABILOS project, OSF10, Glasgow (GB), 11–13 Oct. 1994, and Journal of Lightwave Technology, vol. 12, n°7, July 1995.

However, this extensometer has certain linearity defects due to the low stiffness coefficients of the springs used, and lacks stability due to friction of the mobile part in the fixed part.

DESCRIPTION OF THE INVENTION

The object of the present invention is to remedy the preceding disadvantages by proposing an extensometer having greater measuring dynamics than extensometers with optic fibre and Bragg grating bonded onto a test specimen, which is directly subjected to the magnitude to be measured or stretched between two points. This extensometer also has improved measuring linearity compared with the above-mentioned known extensometer with springs.

With the extensometer subject of the invention, it is possible to step down mechanically a displacement to be measured so as to remain within the range of use of the optic fibre or optic fibres it contains.

In addition, in preferred embodiments, it can compensate temperature effects and can be mounted in easy, reproducible manner which avoids systematic calibration of the sensor or sensors, i.e. of the Bragg grating(s) contained in this extensometer.

More precisely, the subject of the present invention is an extensometer intended to measure deformations of a host material, this extensometer comprising at least one test specimen and at least one Bragg grating, this Bragg grating being formed in an optic fibre which is made integral with the test specimen, for example by bonding, any deformation of the host material thereby being transmitted to this Bragg grating via the test specimen, this Bragg grating then being able to modify a light propagating within the fibre, the deformation of the host material being determined from the modified light.

The extensometer is characterized in that the test specimen undergoes linear bending stresses, while remaining within its range of elastic deformation, and in that this extensometer also comprises mechanical means able to transform a deformation of the host material into bending of the test specimen, this bending deforming the Bragg grating.

Preferably, the mechanical means comprise a first part which is intended to be made rigidly integral with the host material and in which the test specimen is fixed, and a second part which is also intended to be made rigidly integral with the host material and which is able to move within the first part and cause bending of the test specimen.

According to a preferred embodiment of the extensometer subject of the invention, the second part comprises a rod designed to slide within the first part and ending in a tip designed to come into contact with the test specimen, during deformation of the host material, and to cause bending of this test specimen.

According to a preferred embodiment of the invention, the test specimen is a flexible plate working in its linear range of elasticity and on which, in the plane in which flexion forces are exerted, the fibre containing the Bragg grating is bonded, this bonding being homogeneous to minimise irregularities induced on the curvature of the plate.

Flexion induces a micro-deformation on the Bragg grating, which is proportional to the magnitude to be measured, the coefficient of proportionality being dependent upon the radius of curvature of the flexible plate at the point where the Bragg grating is implanted.

It is advantageous to make this coefficient of proportionality independent of the location of the Bragg grating in the plane of exertion of flexion, i.e. independent of the curvilinear abscissa of this Bragg grating so as to control the response curve of the sensor forming the extensometer, and to avoid a deformation gradient of the Bragg grating, which would cause its spectral deformation or "chirp", or further so as to associate a second Bragg grating with the first for temperature correction. For this purpose the flexible plate needs to be iso-stressed in flexion, which corresponds to a preferred embodiment of the invention.

Among iso-stressed plates the simplest to fabricate is of constant thickness and is in the form of an isosceles triangle, which is a preferred embodiment of the plate.

The extensometer subject of the invention preferably comprises two test specimens respectively consisting of first and second flexible plates, these flexible plates being positioned opposite one another and designed to undergo bending simultaneously during deformation of the host material.

The extensometer subject of the invention preferably comprises another Bragg grating fixed onto the other face of the flexible plate, at a point of similar curvature, and designed to compensate thermal effects likely to affect said Bragg grating, the latter grating and said other grating having different Bragg wavelengths.

Preferably, when the extensometer comprises the two flexible plates, it also comprises two Bragg gratings whose respective Bragg wavelengths are different, one of the Bragg gratings being fixed on one face of the first flexible plate, a face made concave by bending, the other Bragg grating being fixed on a face of the second flexible plate, a face made convex by bending.

If the variant is used in which the flexible plate is iso-stressed, the two Bragg gratings do not necessarily face one another on the two faces of the plate. On the other hand, if this variant is not used, it is important for the two Bragg gratings to lie opposite one another on the two faces of the plate.

BRIEF DESCRIPTION OF THE DRAWINGS

The present invention will be more readily understood on reading the description of examples of embodiments given below solely for illustrative purposes and in no way limitative, with reference to the appended drawings in which.

DETAILED DESCRIPTION OF PARTICULAR EMBODIMENTS

Figure 1:
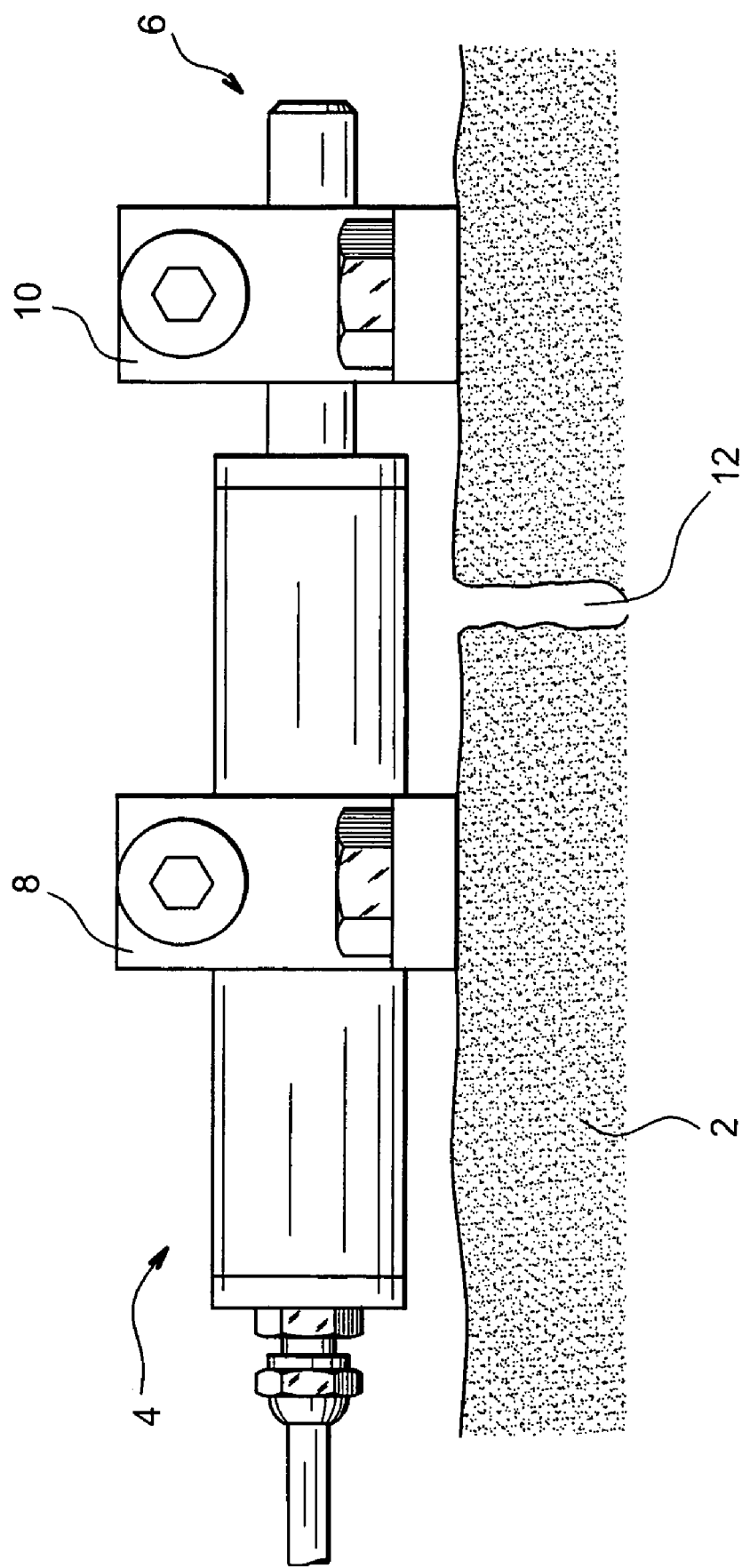
FIG. 1 is a diagrammatic side view of an extensometer according to the invention, FIG. 2 schematically illustrates the principle of this extensometer.

The extensometer of the invention which is schematically shown from a side view in FIG. 1, is intended to measure deformations (contractions or expansions) of a host material, which in this example is a structure in concrete.

FIG. 1 shows the part in concrete 2 of this structure whose deformation it is wished to examine using this extensometer.

This extensometer will be described in more detail below, but it is henceforth indicated that it comprises a first part 4, called <<fixed part>>, and a second part 6, called <<mobile part>>, which is able to move with respect to the fixed part during deformation of the host material.

Parts 4 and 6 are respectively made rigidly integral with the host material using suitable means 8 and 10. In the example, these means 8 and 10 are anchoring means enabling parts 4 and 6 to be fixed to the surface of the concrete part 2.

It can be seen that a crack 12 has formed in the concrete, between the anchor points of parts 4 and 6 of the extensometer, so that the mobile part has distanced itself from the fixed part, generally by a few millimetres.

The extensometer of the invention makes it possible to evidence and even to measure this displacement and hence the size of the crack 12.

As will be seen in more detail below, the extensometer for this purpose comprises mechanical means with which to transform the displacement of the mobile part 6, which may be in the order of a few millimetres, into the bending of at least one flexible test specimen.

This latter is preferably a flexible plate of which one end is fixed in the fixed part 4. The bending of this plate varies in relation to the position of the mobile part 6 with respect to the fixed part 4.

This extensometer also comprises at least one Bragg grating photo-written into the core of an optic fibre that is preferably single mode, in silica for example. This grating, or more precisely the fibre portion in which it is formed, is fixed by bonding for example, onto the flexible plate.

Any deformation of the concrete is transmitted to the Bragg grating via the flexible plate. This Bragg grating modifies the light it receives from appropriate measuring means.

This light returns to the measuring means via the optic fibre, and the deformation of the concrete is determined by these measuring means using the light so modified.

Figure 2:
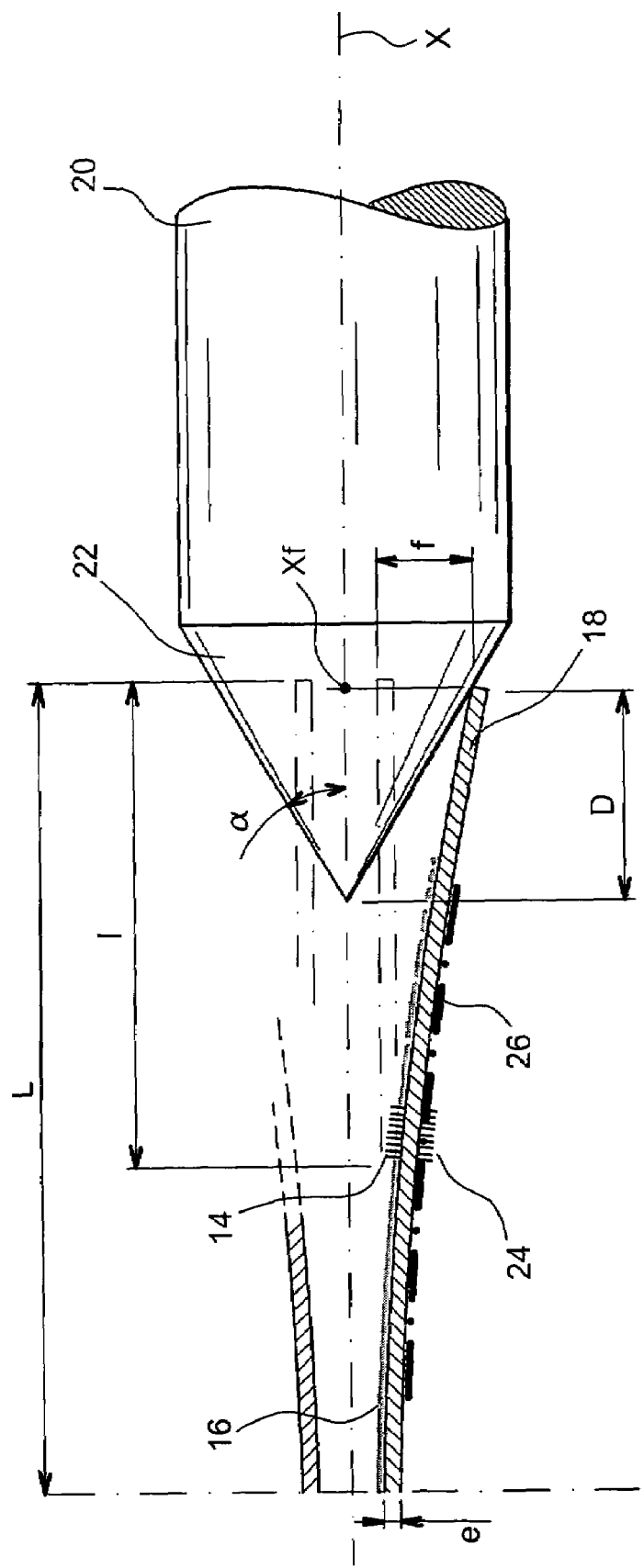

The principle of this extensometer is schematically illustrated FIG. 2 and therefore consists of fixing a measurement Bragg grating 14 (photo-written in an optic fibre 16) onto a flexible plate 18 mounted in a stress bed. The displacement to be measured D is transmitted by means of a rod 20 provided with a tip 22 making it possible to step down this displacement to be measured.

For reasons relating to simple processing of measurements, the flexion bed may advantageously have a linear response in relation to the deflection exerted, denoted f. This flexion bed may be of two types, either a four-point flexion bed or an embedded plate in flexion.

The case which will be described in detail concerns an embedded plate in flexion as can be seen on FIG. 2.

The choice of an embedded plate in flexion is warranted by the fact that the relative elongation ϵ of the Bragg grating is a linear function of deflection f, so that:

$$\varepsilon = \frac{3el}{2L^3} f$$

in which:
ϵ: relative elongation of the Bragg grating
e: plate thickness,
l: distance between the point of application of stress and the Bragg grating
L: distance between application of stress and embedding
f: deflection applied at abscissa x=L (calculated on axis X, parallel to non-deflected plate).

Tests conducted with a Bragg grating inserted in a plate of composite material have shown that the response of this type of system correctly follows this law.

Using this law, a flexion bed can be defined which can be used to measure displacements above the elastic limit of silica.

Purely for guidance purposes and in no way limitative, the following values may be used:
L=150 mm,
distance from Bragg grating to the point of stress application (abscissa point Xf on X axis parallel to the non-deflected plate): 100 mm
e=4 mm, surface bonded grating,
displacement to be measured: 0 to 50 mm,
tangent of semi-angle at apex α of the tip=0.25.

The relative elongation at a point of an embedded plate is linear in relation to deflection if deflection is applied at the same abscissa denoted Xf. However, with the extensometer the point of application varies with displacement of the tip. The system's linearity error must therefore be estimated.

Having regard to the equation of the deforming of said system, we have:

$$y = -\frac{1}{2} \frac{f}{L^3} (x^3 - 3L^2 x + 2L^3)$$

in which:
y: deforming of the plate,
L: distance between application of the stress and embedding,
f: deflection applied at x=L.

It is possible to calculate the point of application of deflection with knowledge of the length of the deflected plate, using the following formula:

$$L = \int_o^x \sqrt{1+y'^2}\, dx \text{ i.e. } L = \int_0^x \sqrt{1 + \left(\frac{1}{2}\frac{f}{L^3}(3x^2 - 3L^2)\right)^2}\, dx$$

The error of application of deflection induces an error of linearity which can be quantified.

Purely by way of illustration and in no way limitative, let us re-use the values previously chosen for the plate:
Length L=150 mm,
Distance from Bragg grating to Xf=100 mm,
Thickness e=4 mm, surface bonded grating,
Displacement to be measured 0 to 50 mm,
Tangent of semi-angle at apex α of the tip=0.25.

It is found that the error is less than 1%. It can be corrected mathematically.

Let us now consider the problem of the spectral deformation of the Bragg grating and more precisely the influence of a relative elongation gradient of this grating.

The deformation of the plate is linear in relation to the distance between the point of application of the stress and the Bragg grating. As it is not a point grating (it is a few mm long) it is therefore subjected to a variable deformation over its length and its spectral response is therefore widened. It measures a deformation gradient which causes it to <<chirp>>.

Since this gradient is linear, the spectral deformation of the Bragg grating is symmetrical. As relative elongation is measured using the spectral displacement of the apex of the Bragg peak, the latter gives information on deformation at the centre of the grating. Using software for modelling a Bragg grating in relation to the parameters with which it was written, it is possible to determine the effect of said deformation gradient on pitch Λ of the grating and on its spectrum.

Let us consider, as an example, a Bragg grating 5 mm in length, written at 1500 nm, <<chirped>> by a relative elongation gradient of 1000 µϵ.

When at rest, the Bragg wavelength of the grating is 1500.17 nm and the spectral width of this grating is 0.2448 nm at mid-height, then once -subjected to elongation this width increases to 1.12 nm at mid-height and the Bragg wavelength increases to 1500.90 nm. Measurement of minimum transmission is no longer pertinent but the central wavelength of the Bragg grating represents the deformation at its centre, i.e. 500 µϵ.

When the grating is bonded onto a plate, the elongation gradient is smaller and its influence on the spectrum is less sensitive. The following example illustrates the extreme case of <<chirp>> in which the grating is bonded onto that part of the plate that is subjected to the greatest. elongation gradient.

In this example, the following values are used for the plate:
length L=150 mm,
distance from Bragg grating to Xf=147.5 mm,
thickness e=4 mm, surface bonded grating,
displacement to be measured 0 to 50 mm,
tangent of semi-angle at apex α of the tip=0.8.

For a displacement of 50 mm, the Bragg wavelength becomes 1515.8655 nm and the spectral width at mid-height becomes 0.4344 nm.

It is found that the elongation of the spectral response of the Bragg grating is visible in the upper part of the spectrum but does not deform the apex. Therefore, with this type of sensor, Bragg gratings can be used without taking the elongation gradient into account. This is one of the determinant advantages of the invention.

It is possible to calculate the relative uncertainty of calibration of the extensometer of the invention using the theoretical determination of relative elongation. This gives:

$$\frac{\delta \varepsilon}{\varepsilon} = \frac{\delta \varepsilon}{e} + \frac{\delta l}{l} + \frac{3\delta L}{L}$$

in which:

δϵ: uncertainty for relative elongation

δe: uncertainty for plate thickness (measured with a caliper): 0.01 mm

δl: uncertainty for location of the Bragg grating (using a thermal detection method): 1 mm δL: uncertainty for plate length (measured with a caliper): 0.01 mm.

For example the following are chosen:

length L=150 mm±0.01 mm distance from Bragg grating to Xf=100 mm±1 mm thickness e=4 mm, surface bonded grating±0.01 mm displacement to be measured 0 to 50 mm tangent of semi-angle at apex α of the tip=0.25

This gives:

$$\frac{\delta \varepsilon}{\varepsilon} = \pm 1,27\%$$

It is ascertained that uncertainty relates especially to the positioning of the Bragg grating.

Let us now consider compensation of the temperature effect on the Bragg grating 14.

To compensate this temperature effect on this Bragg grating 14, we use another Bragg grating 24 which is bonded symmetrically on the other face of plate 18 and which undergoes equal relative elongation but of opposite sign to that of grating 14. This assumes that gratings 14 and 24 are embedded in merged or parallel planes, at two points where the radius of curvature of the plate under the effect of the displacement to be measured D is the same, as in FIG. 2.

If the test specimen is not a plate iso-stressed in flexion, these gratings necessarily face one another on the two faces of the plate.

If the test specimen is a plate iso-stressed in flexion, i.e. a plate in which bending stress is the same in all sections of the effective area, as is the case for example with a triangular plate in the preferred embodiment, these gratings do not necessarily lie opposite one another on the two faces of the plate.

By <<effective area>>, is meant the plate less its end parts which are upstream and downstream of the fixed optic fibre portion, i.e. less the embedded end and less the opposite end in contact with tip 22.

Grating 24 is formed in an optic fibre 26 which, for simplification purposes, may be fibre 16.

The two gratings 14 and 24, which are equidistant from one same end of plate 18 in the example shown, have different Bragg wavelengths: these are respectively 1262 nm and 1266 nm for gratings 14 and 24 in the described example.

The use of the two gratings positioned in this manner leads to self-compensation of the temperature effect.

The two gratings are in fact chosen so that they follow the same law:

$$\frac{\Delta \lambda B}{\lambda B} = a\varepsilon + b\Delta T$$

in which $$\frac{\Delta \lambda B}{\lambda B}$$

is the relative variation of the Bragg wavelength, ϵ is the relative elongation of the grating and ΔT the variation in temperature. The result of the measurement made with the two gratings is therefore:

$$a(\epsilon)+b\Delta T-(a(-\epsilon)+b\Delta T)=2a\epsilon$$

since these two gratings have relative elongations of ϵ and −ϵ respectively.

The relative uncertainty of calibration for said device is twice that of a system with a single grating and entails mounting difficulties as the two gratings must be positioned at the same distance from the application of deflection. A configuration must therefore be sought in which relative elongation is independent of the location of the grating. Said device is described below.

It concerns an equal stressed embedded plate.

As we have seen, the variable 1 (distance from Bragg grating to Xf) is an important modelling parameter which may be a source of error when calibrating the extensometer. A plate of triangular profile which can be seen in FIG. 3 makes it possible to overcome this variable.

The equation for the deforming of this plate is a portion of an arc of a circle. Since the radius is constant, the stress and relative elongation along the plate are constant. Measurements made on a plate having this geometry made it possible to verify theory.

Purely for illustrative purposes and in no way limitative, the measurement conditions may be as follows:

length of triangular plate L=190 mm, thickness of this plate e=3 mm, base of triangle formed by this plate=40 mm, deflection f=29.6 mm, radius=578 mm.

The relative longitudinal elongation ϵ at every point of the triangular plate is expressed as follows:

$$\varepsilon = \frac{e}{L^2}f$$

Calibration uncertainty is therefore:

$$\frac{\delta \varepsilon}{\varepsilon} = \frac{\delta e}{e} + \frac{2\delta L}{L}$$

in which:

δϵ: uncertainty for relative elongation,

δe: uncertainty for plate thickness=0.01 mm

δL: uncertainty for plate length=0.01 mm.

Purely for illustrative purposes and in no way limitative a numerical example is given below:

Length L=150 mm±0.01 mm,

Plate thickness=4 mm, surface bonded grating±0.01 mm,

Displacement to be measured 0 to 50 mm,

Tangent of semi-angle at apex α of the tip=0.25.

This gives:

$$\frac{\delta\varepsilon}{\varepsilon} = \pm 0,26\%$$

It is found that the uncertainty of calibration for said system, provided with two Bragg gratings to compensate temperature effect, is in the order of ±0.5%.

Let us now consider correction of linearity error for a plate of triangular shape.

As we have seen, the mathematical model used comprises an error of linearity due to movement of the point of contact with the plate. It is possible to correct this error with knowledge of the point of application of the force exerted by the tip on the plate.

The relative elongation at a point of an embedded plate is linear in relation to deflection if deflection is applied at the same abscissa, again denoted Xf. In the case under consideration, the point of application varies with displacement of the tip. An estimate must therefore be made of the system's error of linearity.

The equation is known for the deforming of said triangular plate:

$$y = \frac{f}{L^2}x^2 - 2\frac{f}{L}x + f$$

in which:
y: deforming of the plate,
L: distance between application of stress and embedding,
F: deflection applied at abscissa x=L.

It is possible to calculate the point of application of deflection with knowledge of the length of the deflected plate, using the following equation:

$$L = \int_0^x \sqrt{1+y'^2}\, dx \text{ i.e. } L = \int_0^x \sqrt{1+\left(\frac{1}{2}\frac{f}{L^3}(3x^2-3L^2)\right)^2}\, dx$$

The error of application of deflection induces an error linearity which can be quantified. Purely for illustrative purposes, and in no way limitative let use the previously defined plate:

Length L=150 mm,
Distance from Bragg grating to Xf=100 mm,
Plate thickness e=4 mm, surface bonded grating,
Displacement to be measured 0 to 50 mm,
Tangent of semi-angle at apex α of the tip=0.25.

The error obtained is greater than with a plate of rectangular shape, considered above, but remains less than 1%. It may be corrected mathematically.

Figure 3:
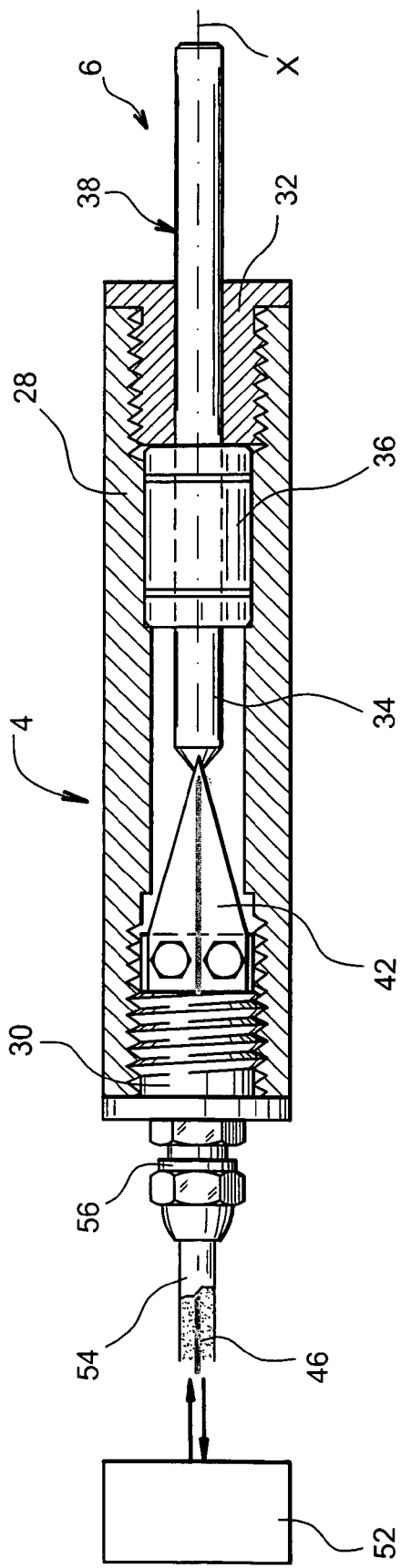
FIG. 3 is a cross-sectional overhead diagram of a particular embodiment of the extensometer subject of the invention.

A particular embodiment of the extensometer subject of the invention is now described with reference to FIGS. 3 et 4. FIG. 3 (respectively 4), shows the example of the invention in a cross-sectional overhead (respectively side) view. This example corresponds to the profile view in FIG. 1.

Figure 4:
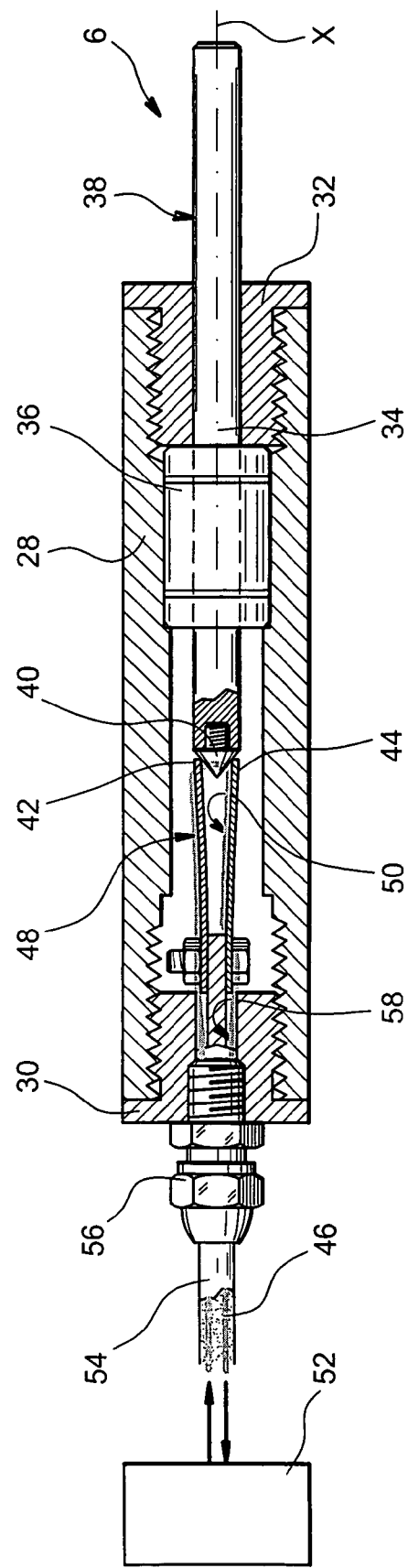
FIG. 4 is a schematic cross-sectional side view of this particular embodiment of the extensometer.

FIGS. 3 and 4 also show the fixed part 4 and mobile part 6.

The fixed part 4 comprises a tube or cover 28 sealed by two-plugs 30 and 32.

To facilitate the installation of the extensometer, this tube 28 is cylindrical and the axis of this tube is denoted X.

The mobile part 6 comprises a rod 34 which can be moved in translation within tube 28 along axis X, through plug 32. To obtain good translation of the rod 34, it slides within a ball sleeve 36 provided in tube 28 in the continuation of plug 32.

One end 38 of the rod 34 remains outside tube 28 and this end 38 is made rigidly integral with a host material when it is wished to measure deformations of this material (FIG. 1).

At the other end of rod 34 a tip 40 can be fixed which is interchangeable in relation to the chosen range of measurement.

By way of example, the diameter of rod 34 is 5 mm and the sum of tolerances on this rod and its housing in tube 28 is ±12 μm, giving a clearance of ±18 μm at the end of tip 40. Said error can be corrected in identical manner to that used to compensate temperature effect.

For reasons of symmetry and in order to avoid distortion of the means allowing translation of the rod, the extensometer in FIGS. 3 and 4 comprises two identical plates 42, 44 inside tube 28, which are fixed to plug 30 and are symmetrical to each other with respect to axis X.

These plates are triangular for the reasons set forth above.

Tip 40 is designed to cause bending of these plates, this flexion varying during deformation of the host material. In the example shown, this flexion leads to causing those faces of plates 42 and 44 which face one another to become convex, and the other faces of these plates to become concave.

The extensometer in FIGS. 3 and 4 is provided with an optic fibre 46 in which two Bragg gratings are formed whose Bragg wavelengths are different.

The portions of fibre designated by arrows 48 and 50 in which these gratings are respectively located, are respectively bonded on the concave face of plate 42 (from which the corresponding portion diverges sideways, before the end of this plate, forming a loop) and on the face of plate 44 which becomes convex.

If the plate is chosen to be a plate iso-stressed in flexion, the glue must evidently be applied uniformly on this plate so as not to destroy or deteriorate this iso-bending characteristic.

As can be seen FIGS. 3 and 4, the optic fibre of which one end is optically coupled to a measurement system 52, successively passes through a protective cable 54, through a gland 56, through a central bore 58 in plug 30, on plate 42 and then on plate 44, forming a loop, then returns through plug 30, through the gland and into the cable and the other end of the fibre optically coupled to a measurement system.

In the example shown FIGS. 3 and 4, the assembly formed by the system and the extensometer operates by transmission: the light emitted by a light source (not shown) contained in the system propagates from one end of the fibre to the other to return into the system after interacting with the Bragg gratings.

It is then analysed by suitable known means, making it possible to determine the deformation of the host material.

According to various variants, not shown, of the example just described with reference to FIGS. 3 and 4:
- the two Bragg gratings can be fixed, one above the other, on one of the two plates, one on its convex face and the other on its concave face;
- in the extensometer provision may be made for a single Bragg grating in which case it is fixed on one of the two plates;
- in the extensometer, a single plate may be provided and two Bragg gratings in which case these two gratings are fixed one above the other on this plate, one on its convex face and the other on its concave face;

in the extensometer, provision may be made for a single plate and a single Bragg grating in which case the grating is fixed on the plate.

In addition, in the example and all the above variants, the measurement system may be designed to <<poll>> the Bragg grating or gratings in both directions, and hence to send the light from the source into either of the two ends of the fibre and then to recover, at the other end, the light which has interacted with this grating or these gratings for the analysis of this light.

Also, it is possible to use a measurement system-extensometer assembly which operates by reflection instead of by transmission. In this case, only one end of the optic fibre is optically coupled to the measurement system, the light from the source being sent into the grating(s) by this end and the light which has interacted with this or these gratings being recovered at this same end. The other end of the fibre therefore remains in tube 28 without being connected.

The invention claimed is:

1. Extensometer to measure the deformations of a host material this extensometer comprising at least one test specimen and at least one Bragg grating formed in an optic fibre which is made integral with the test specimen, any deformation of the host material being transmitted to the Bragg grating via the test specimen, the Bragg grating configured to then being able to modify a light propagating in the fibre, the deformation of the host material being determined using the modified light, the extensometer being characterized in that the test specimen undergoes linear bending stresses while remaining within its range of elastic deformation, and in that this extensometer also comprises mechanical means able to transform deformation of the host material into bending of the test specimen, this bending deforming the Bragg grating, wherein the mechanical means comprise a first part, intended to be made rigidly integral with the host material and in which the test specimen is fixed, and a second part also intended to be made rigidly integral with the host material and which is able to move within the first part and to cause bending of the test specimen.

2. Extensometer as in claim 1 wherein the second part comprises a rod designed to slide within the first part and ending in a tip designed to come into contact with the test specimen, during deformation of the host material, and to cause bending of this test specimen.

3. Extensometer as in claim 1, wherein the test specimen is a flexible plate working within its linear range elasticity and on which, in the plane in which flexion is exerted, the fibre comprising the Bragg grating is bonded, this bonding being homogeneous in order to minimise irregularities induced on the curvature of the plate.

4. Extensometer as in claim 3, wherein the plate is iso-stressed in flexion.

5. Extensometer as in claim 4, wherein the plate is of constant thickness and is of isosceles triangle shape.

6. Extensometer as in claim 3, comprising another Bragg grating, fixed to the other face of the flexible plate, at a point of similar curvature, and designed to compensate thermal effects likely to affect said Bragg grating the latter and said other grating having different Bragg wavelengths.

7. Extensometer as in claim 1, comprising two test specimens respectively comprising first and second flexible plates positioned one facing the other and designed to undergo simultaneous deflection during deformation of the host material.

8. Extensometer as in claim 7, comprising two Bragg gratings whose respective Bragg wavelengths are different, one of the Bragg gratings being fixed on one face of the first flexible plate, a face made concave by bending, the other Bragg grating being fixed on a face of the second flexible plate, a face made convex by bending.

9. An extensometer configured to measure a deformation in a host material, the extensometer comprising:
a first Bragg grating configured in an optic fibre integral with at least one test specimen, wherein the Bragg grating is configured to modify a light propagating in the optical fibre of the test specimen to determine an amount of deformation of the host material;
a first mechanical part coupled to the host material, wherein the first mechanical part includes the test specimen fixed therein; and
a second mechanical part coupled to the host material, the second mechanical part configured to move with respect to the first mechanical part and configured to transform deformation of the host material into a bending of the test specimen to deform the Bragg grating, wherein the bending of the test specimen includes a linear bending stress of the test specimen within a range of elastic deformation.

10. Extensometer as in claim 9, wherein the second mechanical part further comprises a rod configured to slide within the first mechanical part and having a tip configured to come into contact with the test specimen during deformation of the host material and cause bending of the test specimen.

11. Extensometer as in claim 9, wherein the test specimen comprises a flexible plate having a linear range elasticity in the plane in which flexion is exerted.

12. Extensometer as in claim 11, wherein the flexible plate is capable of being iso-stressed in flexion.

13. Extensometer as in claim 11, wherein the flexible plate has a substantially constant thickness and includes an isosceles triangle shape.

14. Extensometer as in claim 11, further comprising a second Bragg grating fixed to a second face of the flexible plate and having a different Bragg wavelength than the first Bragg grating.

15. Extensometer as in claim 9, wherein the Bragg grating is homogeneously bonded onto the optical fibre.

16. Extensometer as in claim 9, wherein the test specimen further comprises two test specimens each including first and second flexible plates positioned to be facing one another, wherein the first and second flexible plates configured to simultaneously deflect during deformation of the host material.

17. Extensometer as in claim 16, further comprises a second Bragg grating fixed to a face of the second flexible plate wherein the face of the second flexible plate is convex during bending, the first Bragg grating fixed to a face of the first flexible plate which is concave during bending.

* * * * *